US007079916B2

(12) United States Patent
Stimpson

(10) Patent No.: US 7,079,916 B2
(45) Date of Patent: Jul. 18, 2006

(54) ON DEMAND MOBILE MANUFACTURE OF VEHICLE PROTECTION APPLICATION KITS

(75) Inventor: James G. Stimpson, Fort Myers, FL (US)

(73) Assignee: Ultrashield, LLC., Fort Myers, FL (US)

( * ) Notice: Subject to any disclaimer, the term of this patent is extended or adjusted under 35 U.S.C. 154(b) by 495 days.

(21) Appl. No.: 10/464,530

(22) Filed: Jun. 19, 2003

(65) Prior Publication Data

US 2004/0010335 A1 Jan. 15, 2004

Related U.S. Application Data

(60) Provisional application No. 60/390,114, filed on Jun. 21, 2002.

(51) Int. Cl.
*G06F 19/00* (2006.01)

(52) U.S. Cl. ...................... 700/123; 700/131; 700/135; 296/136.07; 709/200

(58) Field of Classification Search ................ 700/117, 700/123, 131, 134–135; 705/26–27, 29; 112/102.5, 470.04; 296/136.01, 136.07; 709/200

See application file for complete search history.

(56) References Cited

U.S. PATENT DOCUMENTS

| | | | | |
|---|---|---|---|---|
| 4,905,159 | A | 2/1990 | Loriot | |
| 4,961,149 | A | 10/1990 | Schneider | |
| 5,089,971 | A | 2/1992 | Gerber | |
| 5,280,989 | A | 1/1994 | Castillo | |
| 5,820,201 | A | 10/1998 | Jabalee | |
| 5,931,522 | A | 8/1999 | Roskey | |
| 5,960,204 | A * | 9/1999 | Yinger et al. | 717/176 |
| 6,062,629 | A | 5/2000 | Gentile | |
| 6,124,044 | A | 9/2000 | Swidler | |
| 6,183,580 | B1 | 2/2001 | Harrell | |
| 6,196,146 | B1 | 3/2001 | Goldberg | |
| 6,434,444 | B1 | 8/2002 | Herman | |
| 6,470,228 | B1 * | 10/2002 | Turner et al. | 700/97 |
| 6,556,904 | B1 | 4/2003 | Larson | |
| 6,564,188 | B1 | 5/2003 | Hartman et al. | |
| 6,859,699 | B1 * | 2/2005 | Carroll et al. | 701/33 |
| 6,892,216 | B1 * | 5/2005 | Coburn et al. | 709/200 |

* cited by examiner

*Primary Examiner*—Leo Picard
*Assistant Examiner*—Douglas S. Lee
(74) *Attorney, Agent, or Firm*—Sughrue Mion, PLLC

(57) ABSTRACT

A mobile client for the automated production of forms, shapes, or patterns communicates with a library server. The patterns have predetermined dimensions and may be applied to surfaces of vehicles for the protection of the surfaces. A business method involving the mobile client and the library server includes single-use transactions.

21 Claims, 4 Drawing Sheets

ON DEMAND MOBILE MANUFACTURE OF VEHICLE PROTECTION APPLICATION KITS

CROSS-REFERENCE TO RELATED APPLICATIONS

This application claims the benefit of U.S. Provisional Application No. 60/390,114, filed Jun. 21, 2002, which is incorporated by reference, herein, in its entirety.

FIELD OF THE INVENTION

This invention relates to a mobile apparatus for the automated production of forms, shapes, or patterns. In a preferred embodiment, the patterns have predetermined dimensions and are used for the protection of painted surfaces on all modes of transportation.

BACKGROUND OF THE INVENTION

Weather and environmental hazards, as well as road and other debris are formidable enemies of the vehicle owner seeking to maintain the like-new appearance and residual value of a vehicle such as a car, boat, plane, motorcycle, custom coach, RV and virtually all modes of transportation. All of these will be referred to hereafter, for the sake of convenience, as "vehicles".

Present methods used to help prevent damage to painted surfaces include cloth coverings (auto "bras"), plastic non-flexing shields ("bug shield"), and flexible urethane or PVC film.

An auto bra is a cloth-like covering that is attached to the front of a vehicle either by elastic straps or mechanical fasteners. These do not provide an exact fit. Moisture and debris can get in between the auto bra and the vehicle. During periods in which the vehicle is moving, an auto bra can vibrate. The vibration itself is not beneficial to the vehicle finish, and vibration over such moisture and debris actually can be detrimental to the vehicle finish, causing marring or discoloration.

Plastic bug shields are mechanically fastened to the hood of a vehicle. This attachment is itself disadvantageous, and such bug shields are often unsightly and undesirable to vehicle owners. Furthermore, the attachments can break, leaving the shield free to move in such a manner that may cause damage to the vehicle surface.

Flexible Urethane and PVC films are currently the most effective process for protecting vehicle surfaces. Typically, a set of one or more patterns (i.e., a kit) is manufactured at a factory or some other fixed location. Such kits are applied at the manufacturing or production site, forcing the consumer to bring the vehicle to the production site. When it is undesired or inconvenient for the consumer to bring the vehicle to the production site, it is also common practice to deliver the kit to the consumer's location.

Both of these prior approaches are disadvantageous. Consumers do not like to come to the production site, and prefer delivery and installation at a more convenient location.

Taking a kit to a consumer location is problematic because the correct kit to take cannot always be correctly known. For example, consumers often make mistakes when indicating the precise vehicle model, vehicle year, and any vehicle modifications. When this happens, the service provider arrives at the consumer site with the wrong kit. The correct kit must then be identified and a production request initiated. The service provider must travel to the production facility and then travel back to the consumer site. Moreover, the kit originally ordered must then either be stored for possible (though uncertain) future use or be discarded.

One approach to mitigate the preceding problem of the customer ordering the wrong kit is to travel to the customer site with an inventory of kits, in the hope that at least one of them will be the correct kit. This is not a good solution because it requires the production of multiple kits for every order.

Furthermore, taking a variety of kits for a given installation on a consumer vehicle does not accommodate the needs of other nearby consumers who may notice the installation on the one vehicle and desire immediate installation on their different vehicle. In such a case, the other consumer's desire cannot be immediately fulfilled and so there is a risk of losing this kind of ad-hoc or impulse order.

SUMMARY OF THE INVENTION

The object of the invention is to overcome the problems of the aforementioned approaches.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings.

DETAILED DESCRIPTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

Figure 1:
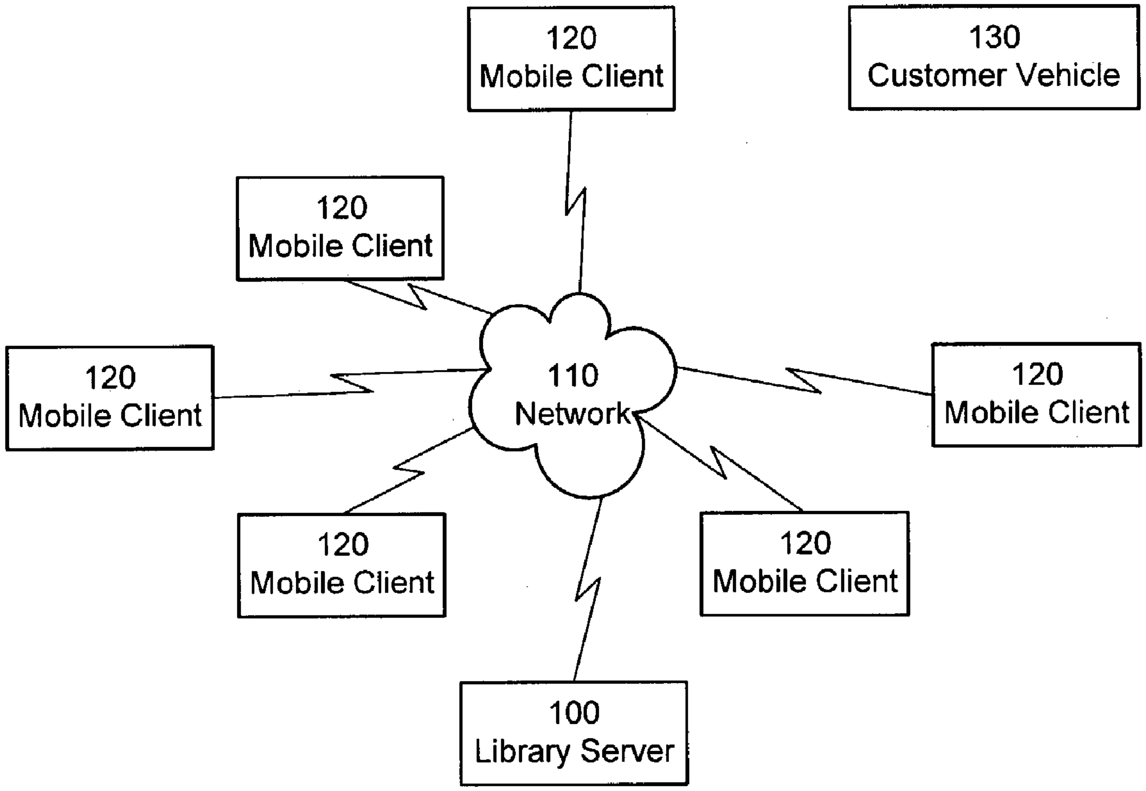
FIG. 1 is a highly simplified schematic diagram showing one embodiment of the invention.

FIG. 1 shows a preferred embodiment of the invention. In FIG. 1, 100 indicates a library server, 110 indicates a network, 120 indicates a mobile client, and 130 indicates a customer vehicle.

Figure 2:
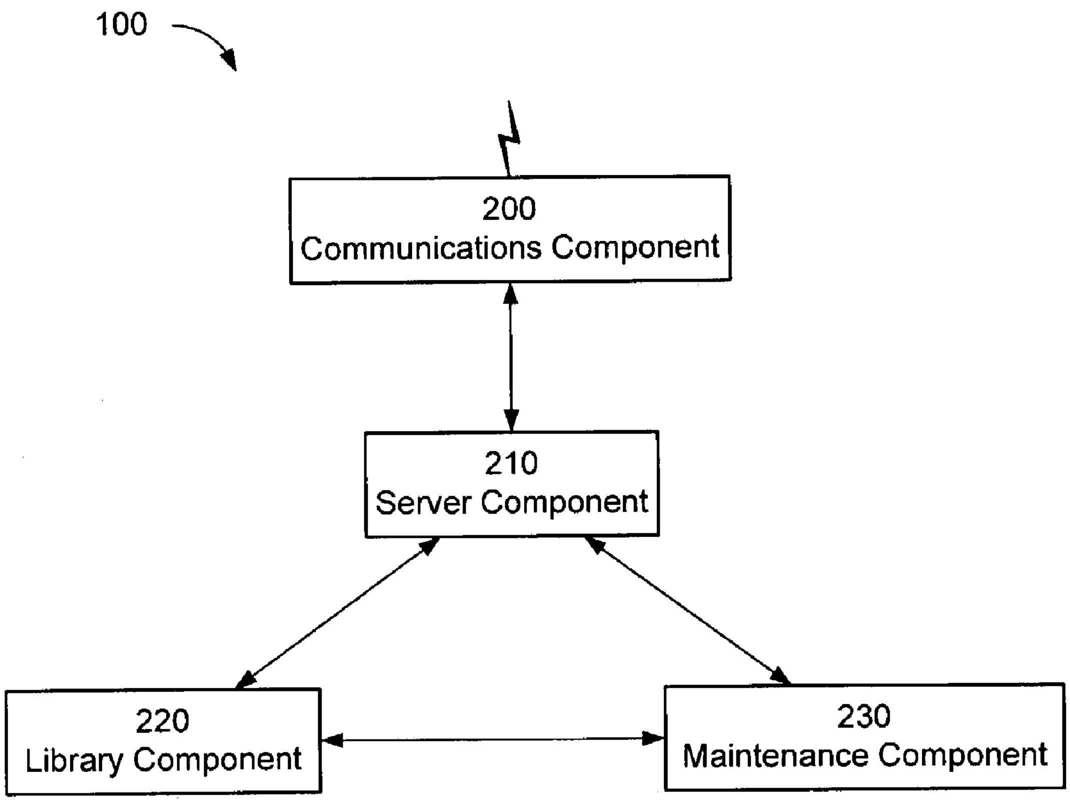
FIG. 2 shows a more detailed view of one of the components depicted in FIG. 1.

The library server 100, shown in more detail in FIG. 2, includes a communications component 200, a server component 210, a library component 220, and a maintenance component 230.

The communications component 200 of the library server 100 communicates with other entities such as mobile client 120 via network 110. Any form of electronic communication may be used. In the preferred embodiment being presently discussed, the communication is via a wireless network 110. Network 110 is not limited to wireless communications, but may of course include landline facilities such as the PSTN, satellite links, submarine links, or any other means whereby a server can electronically communicate with a client.

The server component 210 of the library server 100 provides overall control for the library server 100 by communication with the communications component 200, the library component 220, and the maintenance component 230. The server component may be implemented as a general or special purpose computer operating to the instructions provided on a computer readable medium, as an application specific integrated circuit, or as a network of one or more of the foregoing.

The operation of the server component 210 in the context of the present embodiment will become more clear with the discussion of FIG. 4, further below.

The library component 220 of the library server 100 stores data relating to a plurality of different shapes, forms, or patterns (all referred to for convenience, hereafter, as "patterns"). The data may typically be stored in a database. Any database may be used.

For the sake of example, and not by way of limitation, it will be appreciated that the database may be a relational database management system (RDBMS) such as an ORACLE RDBMS, a SYBASE RDBMS, a MICROSOFT ACCESS RDBMS, or any RDBMS available from any other vendor. A hierarchical or network type database such as IMS of IBM may be used. Object databases or object oriented databases may be used. Furthermore, a custom database management system may also be used.

The actual determination of pattern dimensions is well understood in this field, and will not be discussed in detail here. Instead, the following portions of the U.S. patents indicated below are incorporated by reference herein for their useful examples of pattern dimension determination approaches and methods:

Roskey, U.S. Pat. No. 5,931,522, Aug. 3, 1999, FIGS. 1 and 2, column 1 line 31 to column 2 line 20;

Castillo, U.S. Pat. No. 5,280,989, Jan. 25, 1994, FIGS. 1 and 3, column 2 line 35 to column 3 line 15;

Gentile, U.S. Pat. No. 6,062,629, May 16, 2000, FIGS. 1–5 and 7, column 4 line 41 to column 6 line 43, column 7 lines 16–27;

Harrell, U.S. Pat. No. 6,183,580, Feb. 6, 2001, FIGS. 1–7, column 3 line 60 to column 4 line 41, column 4 line 50 to column 6 line 31; and Jabalee, U.S. Pat. No. 5,820,201, Oct. 13, 1998, FIGS. 1, 2, 3, and 6, column 3 line 1 to column 4 line 17.

Furthermore, it is possible to determine pattern dimensions by automated scanning equipment which calculates a three-dimensional model of a surface to be fitted with a patterned article.

Retrieval of a pattern or set of patterns may be by any index. In the present embodiment, a pattern number is used to indicate a set of one or more patterns.

It will be appreciated that various representations of a pattern can be stored. For example, in the present embodiment, three representations are stored: a visual representation, a CAD format representation, and a plotter command representation. The visual picture-like representation of the one or more patterns relating to a pattern number is stored in a form easy to display on a computer screen such as a bitmap, JPG, GIF, or the like. The CAD format representation is useable by a CAD program so that various modifications to the pattern can be identified prior to pattern production. Finally, the plotter command representation is in a format useable by a pattern production apparatus such as an automated plotter or cutter (e.g., a set of plotter commands).

The library component 220 is thus responsive to the server component 210 to retrieve a set of one or more patterns indicated by a pattern number or the like.

The maintenance component 230 is provided so as to facilitate ARUD type functions (i.e., Add, Replace, Update, Delete) with respect to the patterns in the library component 220 under the control of server component 210.

Figure 3:
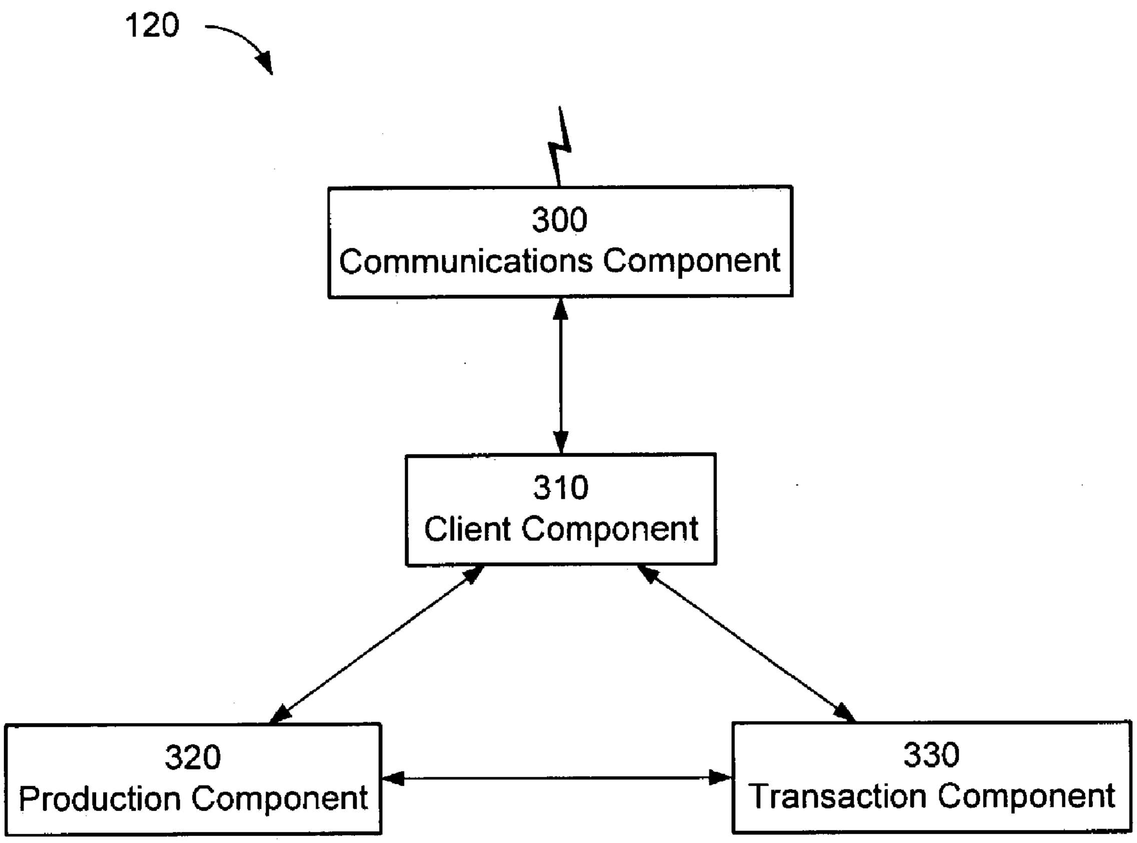
FIG. 3 shows a more detailed view of another one of the components depicted in FIG. 1.

The mobile client 120 is shown in more detail in FIG. 3. The mobile client includes a communications component 300, a client component 310, a production component 320, and a transaction component 330.

The communications component 300 of the mobile client 120 serves a function similar to that of communications component 200 of the library server 100.

The client component 310 of the mobile client 120 provides overall control for the mobile client 120 by communication with the communications component 300, the production component 320, and the transaction component 330. The client component 310 may, in a manner analogous to server component 210 of library server 100, be implemented as a general or special purpose computer operating to the instructions provided on a computer readable medium, as an application specific integrated circuit, or as a network of one or more of the foregoing.

The operation of the client component 310 in the context of the present embodiment will become more clear with the discussion of FIG. 4, further below.

The client component 310 provides a user interface by which a user may perform such functions as logging on with a userid and password, select a set of one or more patterns for visual display, indicate a pattern number for download into a CAD program, run a CAD program to examine or modify a downloaded CAD format pattern, indicate desired pattern modifications, and indicate a desire to have the production component 320 produce a patterned article based on a selected pattern.

The production component 320 may be a computer controlled plotter or cutter, or any similar device which can produce patterned articles from some kind of material in roll or sheet form. Such devices are well known in various fields, and are not themselves described more in detail. Instead, the following portions of these U.S. patents are incorporated herein by reference for their useful background information on the topic of automated plotting or cutting to produce patterned articles:

Schneider, U.S. Pat. No. 4,961,149, Oct. 2, 1990, FIGS. 1–5, column 3 line 21 to column 6 line 50;

Loriot, U.S. Pat. No. 4,905,159, Feb. 27, 1990, abstract; and

Gerber, U.S. Pat. No. 5,089,971, Feb. 18, 1992, FIG. 1, column 3 line 58 to column 4 line 50, column 5 line 41 to column 6 line 16.

The transaction component 330 of the mobile client 120 communicates with the client component 310 and the production component 320. The transaction component 330 handles functions such as logging usage information for billing purposes, and committing transactions.

Figure 4:
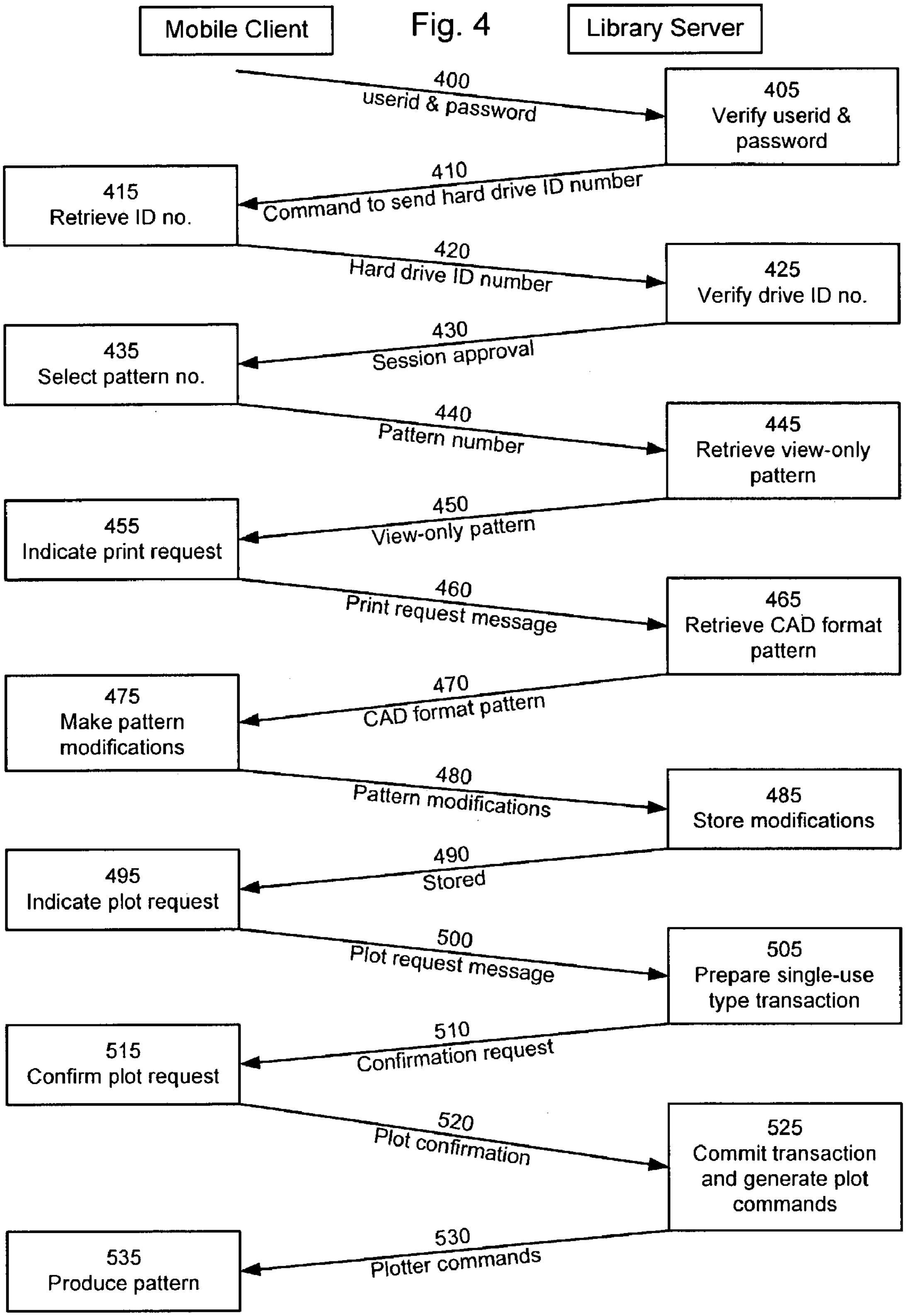
FIG. 4 shows message flows and actions in an exemplary embodiment of the invention.

Prior to discussing the details of a particular implementation of the invention with respect to FIG. 4, the following operations and system overview will be provided.

The mobile client provides for the automated production of patterns with predetermined dimensions from, e.g., adhesive backed Urethane and PVC films. These patterns, when cut, specifically fit different areas on a given vehicle to be protected. The mobile client provides for the manufacture of the patterns, from the library server 100, on demand, at any location. The mobile client may be realized very effectively in the form of a van, truck, or trailer with appropriate customizations. A mobile client provides for a tremendous savings in time spent traveling, and avoids the problems of arriving at the site of the customer vehicle 130 with the wrong set of patterns. Furthermore, the mobile client operator never needs to keep an inventory of patterns because each necessary set of patterns can be produced as patterned articles whenever needed, in whatever quantity is needed.

According to the preferred embodiment of the invention, the mobile client and library server are configured to implement a particular method of doing business wherein the mobile client operator enters into a single-use purchase transaction with respect to a selected set of one or more patterns. That is to say, the mobile client operator incurs a payment obligation for each set of patterns used to produce a corresponding set of patterned articles.

The patterns are thus stored in a "virtual" library (i.e., the library component 220 of library server 100) and accessed through a secure means such as a secure website under the control of server component 210 of library server 100. The patterns, in the form of a set of plotter commands, are sent to the production component 320 (i.e., the automated plotter/cutter), with the film loaded, and a patterned article is produced to fit an exact area for coverage.

The patterns may thus be obtained "online" and can be accessed over a network 110 by, e.g., a wireless web.

To fully equip the mobile client, appropriate power provisions such as 110V inverters can be provided in the customized vans, trucks, or trailers. The mobile clients thus can have built-in plotter/cutters, bulk film storage areas, computers, and cell phones or PCS cards in the computers to access the library server and manufacture patterned articles on demand at any location.

The library server 100 and the mobile client 120 are controlled by server component 210 and client component 310, respectively. The server and client components allow only one pattern to be manufactured at a time. It also prevents the pattern from being stored, copied, or sent anywhere other than the designated plotter/cutter that is linked to the specific computer. The transaction component 330 logs the date, time, and pattern number on the computer in the mobile unit, and also a record may be made under control of the server component 210, and also in a billing server (not shown) for a company or group having more than one mobile client 120. The billing for the manufacture of the patterns can thus be computed at the billing location for each mobile client that manufactures patterns.

When an authorized user logs into the system, a custom ActiveX component may take some verification steps such as obtaining and verifying the hard drive number, username, and password of the user. Once verified, a session is started and the user has permission to indicate a print request when viewing a set of patterns. Selecting the print option may open a new browser window that will have an ActiveX CAD viewing and plotting component that allows the user to view, modify, and request a plot of the pattern. Once the plot request is indicated, a confirmation process can be undertaken to confirm the selection and notify of imminent billing.

Based on the confirmation of the plot request, the transaction component commits the transaction for billing and allows the plot commands to be sent directly to the plotter. Every time a plot request is confirmed, another transaction for billing is committed.

At the mobile client 120, the folder where the CAD format files are be stored has permissions set to prevent downloading or copying. The ActiveX CAD viewing and plotting programs are adapted to prevent copying or downloading the file, or making illegal copies of the pattern.

Reference will now be made to FIG. 4, which depicts the foregoing process in schematic flow diagram form.

The process in FIG. 4 begins when the operator at the mobile client performs a log on process so as to send 400 a user ID and password to the library server. In step 405, the library server verifies the user ID and password. If the verification is successful, then the library server sends a command 410 to the mobile client to return to the library server the identification number of the mobile client's hard drive.

In step 415 the mobile client retrieves the identification number of the hard drive and sends it in a message 420 to the library server. In step 425, the library server verifies that the hard drive identification number is the correct number, and then sends a session approval message 430 to the mobile client.

In step 435, the operator of the mobile client selects a pattern number. The pattern number is indicated to the library server in a message 440, and the library server retrieves a viewable image of the pattern in step 445. That is to say, the library server retrieves the visual representation of the pattern. This representation of the pattern is sent to the mobile client in message 450.

Once the operator at the mobile client is satisfied that the selected pattern is the one to use, the operator indicates a print request operation in step 455 and a corresponding print request message 460 is sent to the library server.

In response to the print request message 460, the library server retrieves the CAD format of the pattern in step 465. The CAD format pattern transmission message 470 typically is a much larger data transmission then the transmission 450 of a pattern in the visual format.

In step 475, the operator at the mobile client can make certain modifications to the CAD format of the pattern. These modifications are sent in a pattern modification message 480 to the library server. The library server stores the modifications in step 485, and indicates successful storage in a message 490 sent to the mobile client.

In step 495, the operator at the mobile client indicates a plot request with respect to the current version of the CAD format pattern. That is to say, if modifications were made in step 475, then the plot request includes such modifications but if no modifications were made, then the plot request is just for the unmodified CAD format pattern. The plot request message 500 is sent to the library server and, in step 505, the library server prepares for the execution of a single-use type transaction.

It will be understood that a single-use type transaction allows the operator at the mobile client to produce only one pattern set only one time. If the operator wants to produce a pattern set more than one time, the operator in the present embodiment incurs a payment obligation for each time.

To avoid the potential problem of inadvertently incurring a payment obligation, the library server sends a confirmation request 510 to the mobile client. The mobile client operator can respond by confirming the plot request in step 515, thereby sending a plot confirmation message 520 to the library server.

Once the plot confirmation message 520 is received at the library server, the library server commits the transaction in step 525, and generates the necessary plot commands to produce the patterned articles. The plotter commands 530 are sent to the mobile client and, in step 535, the production component of the mobile client produces the patterned articles in response to the plotter commands.

Returning now to FIG. 1, it will be appreciated that the patterned articles output from the production component 320 of the mobile client 120 are applied to the customer vehicle 130 by the operator of the mobile client.

Many variations to the above-identified embodiments are possible without departing from the scope and spirit of the invention. Possible variations have been presented throughout the foregoing discussion. Moreover, it will be appreciated that the patterned articles need not be limited to protecting only painted surfaces of vehicles. Instead, the patterned articles could be made of an appropriate material and in an appropriate shape so as to be useful for protecting the glass surfaces of vehicles.

Moreover, it will be appreciated that the patterned articles need not be limited to protecting surfaces of only vehicles. Although the protection of vehicles is the preferred intended use of the invention, it is conceivable that patterned articles could be made for use in many other contexts in which the mobility of the mobile client is a useful feature of the system.

It will also be understood that the examples provided above have been solely for the purpose of equipping the reader with the details of the presently preferred embodiment of the invention. These details are not necessarily the only way in which the invention can be implemented.

For example, the various order of steps shown in FIG. 4 can be changed, with some of the steps being performed in parallel or in a completely different order. Furthermore, some of the steps (such as, e.g., verifying the identification number of the hard drive of the mobile client) can be completely omitted without departing from the scope and spirit of the invention.

As another non-limiting example of a variation, it is possible to store and/or provide the different forms of the patterns (i.e., the visual format, the CAD format, and the plotter commands format) from different sources. That is to say, the visual and CAD formats of the patterns might be stored in a location local to the client component (i.e., a local library), with only the plotter command format being provided via a communications network. The client component could thus access some of the information very quickly (e.g., from a CD kept in the mobile unit) but receive only the plotter commands from a remotely located library server.

As another variation, the library component itself could be stored entirely on a CD kept with the mobile client, but stored in a manner that prevents use of the library data until authorization from the server component.

Other variations might include storing only the visual and CAD formats, and always dynamically generating the plotter commands from the CAD format as needed.

Yet other combinations and subcombinations of the various embodiments described above will occur to those familiar with this field, without departing from the scope and spirit of the invention.

The invention claimed is:

1. A vehicle finish protection method, comprising, in order:

- sending a pattern selection, from a mobile client to a library server, over a communications network;
- sending pattern production commands from the library server to the mobile client;
- producing a patterned article, at the mobile client, according to the pattern production commands;
- disposing the patterned article on the vehicle to protect the vehicle finish.

2. The vehicle finish protection method as set forth in claim 1, further comprising, prior to sending the pattern selection, electronically verifying a mobile client identity.

3. The vehicle finish protection method as set forth in claim 1, further comprising, prior to sending the pattern production commands, generating a transaction record, wherein the transaction record is generated each time the sending of the pattern production commands is performed.

4. The vehicle finish protection method as set forth in claim 3, further comprising prohibiting the mobile client from the set of operations consisting of copying, storing, and transmitting the pattern production commands.

5. The vehicle finish protection method as set forth in claim 1, wherein the mobile client is provided as a motor vehicle with a wireless communications capability for the sending of the pattern selection and for receiving of the pattern production commands.

6. A remote pattern production method, comprising, in order:

- sending a pattern selection, from a mobile client to a library server, over a communications network;
- sending pattern production commands from the library server to the mobile client; and
- producing a patterned article, at the mobile client, according to the pattern production commands;
- wherein the mobile client is provided as a motor vehicle with a wireless communications capability for the sending of the pattern selection and for receiving of the pattern production commands.

7. The remote pattern production method as set forth in claim 6, further comprising, prior to sending the pattern selection, electronically verifying a mobile client identity.

8. The remote pattern production method as set forth in claim 6, further comprising, prior to sending the pattern production commands, generating a transaction record, wherein the transaction record is generated each time the sending of the pattern production commands is performed.

9. The remote pattern production method as set forth in claim 8, further comprising prohibiting the mobile client from the set of operations consisting of copying, storing, and transmitting the pattern production commands.

10. A remote pattern production apparatus, comprising:

- a communications component;
- a client component communicating with the communications component; and
- a production component communicating with the client component and the transaction component;
- the communications component, the client component, and the production component being disposed in a vehicle;
- wherein:
  - the communications component is adapted to receive pattern production commands over a communications network, and provide the pattern production commands to the client component;
  - the client component provides the pattern production commands to the production component; and
  - the production component is responsive to the pattern production commands to produce a patterned article.

11. The remote pattern production apparatus as set forth in claim 10, wherein the client component prohibits user operations, on the pattern production commands, from the set of operations consisting of copying, storing, and transmitting.

12. The remote pattern production apparatus as set forth in claim 10, wherein the vehicle is one of a motor vehicle and a trailer.

13. The remote pattern production apparatus as set forth in claim 12, further comprising providing a 110v power source, in the vehicle, for use by one or more of the communications component, the client component, and the production component.

14. A business method, comprising:

providing a mobile client;

providing a library server;

generating a pattern plot request message at the mobile client;

responding to the pattern plot request message with plotter commands; and producing a patterned article at the mobile client under control of the plotter commands;

wherein one or more of the mobile client and the library server records a financial obligation transaction with respect to an operator of the mobile client every time the patterned article is produced from the plotter commands; and wherein the patterned article produced is one or more patterns of a vehicle surface protection application kit.

15. The business method as set forth in claim 14, further comprising applying the one or more patterns of the vehicle surface protection application kit to a customer vehicle at a customer site.

16. A business method, comprising:

providing a mobile client;

providing a library server;

generating a pattern plot request message at the mobile client;

responding to the pattern plot request message with plotter commands; and producing a patterned article at the mobile client under control of the plotter commands;

wherein one or more of the mobile client and the library server records a financial obligation transaction with respect to an operator of the mobile client every time the patterned article is produced from the plotter commands; and wherein the providing of the mobile client includes providing:

a vehicle;

a communications component;

a client component communicating with the communications component; and a production component communicating with the client component and the transaction component;

wherein the communications component, the client component, and the production component are disposed in or on the vehicle.

17. The business method as set forth in claim 16, wherein the mobile client is provided with at least a partial local library of patterns.

18. The business method as set forth in claim 17, wherein the local library of patterns includes patterns in a visual format.

19. The business method as set forth in claim 17, wherein the local library of patterns includes patterns in a CAD format.

20. The business method as set forth in claim 17, wherein the local library of patterns includes patterns in a plotter commands format.

21. The business method as set forth in claim 17, wherein access by a mobile client operator to the local library is prevented except with authorization by the library server.

* * * * *